(12) United States Patent
Marchese-Ribeaux

(10) Patent No.: US 11,381,546 B2
(45) Date of Patent: Jul. 5, 2022

(54) METHOD FOR SECURING AN INTERCEPTIBLE CALL END-TO-END

(71) Applicant: Atos Integration, Bezons (FR)

(72) Inventor: Alexandre Marchese-Ribeaux, Pontoise (FR)

(73) Assignee: Bull SAS

( * ) Notice: Subject to any disclaimer, the term of this patent is extended or adjusted under 35 U.S.C. 154(b) by 36 days.

(21) Appl. No.: 16/958,245

(22) PCT Filed: Dec. 21, 2018

(86) PCT No.: PCT/EP2018/086829
§ 371 (c)(1),
(2) Date: Jun. 26, 2020

(87) PCT Pub. No.: WO2019/129758
PCT Pub. Date: Jul. 4, 2019

(65) Prior Publication Data
US 2020/0336468 A1    Oct. 22, 2020

(30) Foreign Application Priority Data

Dec. 27, 2017 (FR) ...................... 1701383

(51) Int. Cl.
*H04L 29/06* (2006.01)
*H04L 9/08* (2006.01)
*H04L 9/32* (2006.01)
*H04L 9/40* (2022.01)

(52) U.S. Cl.
CPC .......... *H04L 63/0281* (2013.01); *H04L 9/083* (2013.01); *H04L 9/0894* (2013.01);
(Continued)

(58) Field of Classification Search
CPC ..... H04L 9/083; H04L 63/168; H04L 9/0894; H04L 9/08; H04L 9/3213; H04L 63/0281;
(Continued)

(56) References Cited

U.S. PATENT DOCUMENTS 8,548,467 B2 * 10/2013 Vanderveen .......... H04W 12/08
455/435.1
2006/0048212 A1 * 3/2006 Tsuruoka .............. H04L 9/0866
726/4
(Continued)

OTHER PUBLICATIONS

International Search Report of the International Searching Authority for PCT/EP2018/086829 dated Feb. 13, 2019.
(Continued)

*Primary Examiner* — Mohammad A Siddiqi
(74) *Attorney, Agent, or Firm* — Arc IP Law, PC; Joseph J. Mayo

(57) ABSTRACT

In order to secure interceptible calls end-to-end, an intermediate MIKEY server is used to allow an intermediate SIP server to communicate with a key-management server. The intermediate SIP server intercepts call elements when a call is initialized among a plurality of terminal devices. The intermediate SIP server supplies these intercepted elements to the intermediate MIKEY server, which then establishes a dialogue with the key-management server on the basis of these elements. The result of this dialogue is sent back to the intermediate SIP server, which records same as call metadata allowing direct or deferred use of the call content.

4 Claims, 2 Drawing Sheets

(52) U.S. Cl.
CPC ........ *H04L 9/3213* (2013.01); *H04L 63/0428* (2013.01); *H04L 63/061* (2013.01); *H04L 63/168* (2013.01); *H04L 63/30* (2013.01)

(58) Field of Classification Search
CPC ... H04L 63/061; H04L 63/06; H04L 63/0428; H04L 63/30; H04W 12/04
See application file for complete search history.

(56) References Cited

U.S. PATENT DOCUMENTS

| | | | | |
|---|---|---|---|---|
| 2007/0297418 | A1* | 12/2007 | Lee | H04L 63/00 370/395.52 |
| 2009/0113063 | A1* | 4/2009 | Yeh | H04L 65/1006 709/229 |
| 2010/0138903 | A1* | 6/2010 | Medvinsky | H04L 9/083 726/6 |
| 2010/0332831 | A1* | 12/2010 | Shon | H04L 9/0833 713/168 |
| 2013/0182840 | A1 | 7/2013 | Buckley et al. | |
| 2014/0380056 | A1 | 12/2014 | Buckley et al. | |
| 2015/0074396 | A1* | 3/2015 | Naslund | H04L 9/3213 713/168 |
| 2015/0194008 | A1* | 7/2015 | Kolios | G06Q 20/047 463/17 |
| 2016/0234197 | A1 | 8/2016 | Näslund et al. | |

OTHER PUBLICATIONS

English translation International Search Report of the International Searching Authority for PCT/EP2018/086829 dated Feb. 13, 2019.

* cited by examiner

METHOD FOR SECURING AN INTERCEPTIBLE CALL END-TO-END

FIELD OF THE INVENTION

The object of the invention is a process for the end-to-end securing of an interceptible communication.

The field of the invention is that of end-to-end securing of an interceptible communication.

Interceptible is intended here to mean the setting up of legal wiretapping enabling state administrative authorities to monitor communications even if said communications are end-to-end secured.

PRIOR ART

The MIKEY protocol is known from the prior art and described by RFC 3830, published in August 2004.

This protocol makes it possible to establish session key distribution scenarios between participants in a communication. These participants number at least two, but they may be more numerous.

The principle of this protocol is that the participant initiating the communication, also referred to as the inviting participant, establishes a communication with a key management server, also referred to as KMS server, able to implement the MIKEY protocol.

In practice, the participants use a terminal device. A terminal device is a smartphone on which communication software compatible with the SIP protocol has been installed. Such a telephone is also referred to as a SIP telephone or a SIP phone. Such software can also be installed on a tablet or a personal computer. The installation of such software means that the device on which it is installed can be termed a user agent.

In the context of use of a communication protocol, reference is made to user agent, often called UA. A user agent is a program executed by a terminal device to establish and carry out a communication according to said communication protocol. The user agents are connected via a proxy server. In the literature, the user agent, which is software, is often combined with the user terminal, which is hardware. The combination of hardware and software is also referred to as a terminal device.

The SIP protocol is adapted to obtain session keys by requesting them from a key management server using the MIKEY protocol.

An inviting terminal device, i.e. the one initiating the creation of the communication session, begins by carrying out a protocol exchange with a key management server.

In practice, the inviting terminal device transmits, to the key management server, a ticket initialization message. Such a message comprises a list of identifiers, including at least:
An identifier of the inviting terminal device;
An identifier of the invited terminal device.

In response, the inviting terminal device receives a response comprising:
A ticket,
A session key per identifier present in the ticket initialization message.

The inviting terminal device continues the initialization of the session by transmitting a SIP invitation message to a first intermediate server, also referred to as SIP proxy. This invitation message designates the second terminal device and comprises, in its payload, a parameter named "key-mgmt", the value of which is the ticket received in response to the ticket initialization message.

The second terminal device receives the SIP invitation message and performs the two following actions:
Transmission of a ticket resolution message to the key management server, which makes it possible for it to receive:
A ticket response,
A session key per identifier present in the ticket initialization message.
Transmission of a SIP acceptance message. This invitation message designates the first terminal device and comprises, in its payload, a parameter named "key-mgmt", the value of which is the ticket received in response to the ticket resolution message.

The first terminal device receives the SIP acceptance message and the communication begins.

In the scenario of the prior art, the terminal devices are autonomous for the management of the session keys, i.e. they are the only ones to know them. The communications are therefore not interceptible, in particular at the SIP proxy which is the service provider. The service provider enables the communication to be held, whether it is secure or not.

An intermediate solution described by application US20160234197 consists in proposing a key management server at which the devices wishing to communicate must first of all carry out storage which makes it possible for each of them to receive a respective key which, during the initiation of communication, will enable them to decrypt a message containing the key which will be used by the communication between the 2 devices.

However, such a solution is not optimal for an interception, since the interceptor also needs several different items of data in order to be able to actually decrypt the communication.

Another solution, described by application US2007297418, proposes a process for end-to-end securing of an interceptible communication, making it possible to recover the session keys by making a direct request to the devices, which can accept or refuse to respond to the request. This thus makes it possible to be able to identify the devices that are not cooperating with said request.

Such an implementation, which is technically operational, does not meet the legal requirements of states wishing to be able, on a case-by-case basis, to access the contents of communications in order to be able to carry out a law enforcement mission.

DISCLOSURE OF THE INVENTION

The invention solves these problems by proposing using a second intermediate server between the SIP proxy and the key management server. The second intermediate server behaves, as seen from the key management server, as a terminal device. The second intermediate server enables the first intermediate server to obtain the cryptographic elements enabling the interception or retrieval of a communication.

The second intermediate server masks all the complexity of the MIKEY protocol from the first intermediate server. The exchanges between the first intermediate server and the second intermediate server take place according to a simple protocol: HyperText Transfer Protocol (HTTP).

This implementation enables easy implementation on all known and future SIP proxies. Indeed, all the complexity of the MIKEY protocol is on the second intermediate server side.

With this in mind, the object of the invention is a process for end-to-end securing of an interceptible communication between at least a first terminal device and a second terminal device, wherein:
the communication is established via a first intermediate server, which communicates using a session initiation protocol making it possible to exchange session keys, each terminal device using a session key to encrypt the communication data it is transmitting,
the session keys are distributed by a key management server which communicates using a key management protocol,
the process comprising at least the following steps, implemented by the first intermediate server:
receipt of an invitation message, transmitted by the first terminal device, according to the session initiation protocol, the invitation message inviting the second terminal device and comprising a ticket according to the key management protocol,
receipt of a message of acceptance of the invitation message comprising a result of the processing of the ticket by the second terminal device,
characterized in that the process also comprises the following steps, implemented by the first intermediate server:
before transmitting the invitation message to the second terminal device:
saving (1030) of the ticket received via the invitation message,
before transmitting the acceptance message to the first terminal device:
production (1090) of a ticket decode request message comprising:
the saved ticket,
the result of the processing of the ticket,
transmission (1100) of the decode request message bound for a second intermediate server,
receipt (1160) of a decode response comprising at least the session keys of the communication being established,
storage (1170) of the session keys by associating them with communication metadata.

Thus, the process according to the present invention can do away with a step of prior storage of the communicating devices on a key management server which would provide a provisional key, by enabling the server, during the initiation of the communication, to produce and configure 2 keys itself and to send them to said devices.

In addition to the main features mentioned in the previous paragraph, the process according to the invention may have one or more of the following additional features, considered individually or in the technically possible combinations:
The second intermediate server, upon receipt of the decode request message, implements the following steps:
production of a ticket resolution message, according to the key management protocol, comprising:
the saved ticket,
a specific identifier designating the second intermediate server as a particular guest in the communication being established,
transmission of the ticket resolution message to the key management server,
receipt of a resolution response,
production of the decode response based on the resolution response.
The communication metadata are chosen from a set formed of at least:
a unique identifier of the communication,
an identifier of the inviter,
an identifier of the invitee,
a communication start date,
a communication end date.
The communications between the first intermediate server and the second intermediate server are conducted using the HTTP protocol.

BRIEF DESCRIPTION OF THE FIGURES

Other features and advantages of the invention will emerge from reading the following description, with reference to the appended figures, wherein.

For greater clarity, identical or similar elements are identified by identical reference symbols in all the figures.

The invention will be better understood by reading the following description and examining the accompanying figures. These are presented by way of indication and in no way limit the invention.

DETAILED DESCRIPTION

Figure 1:
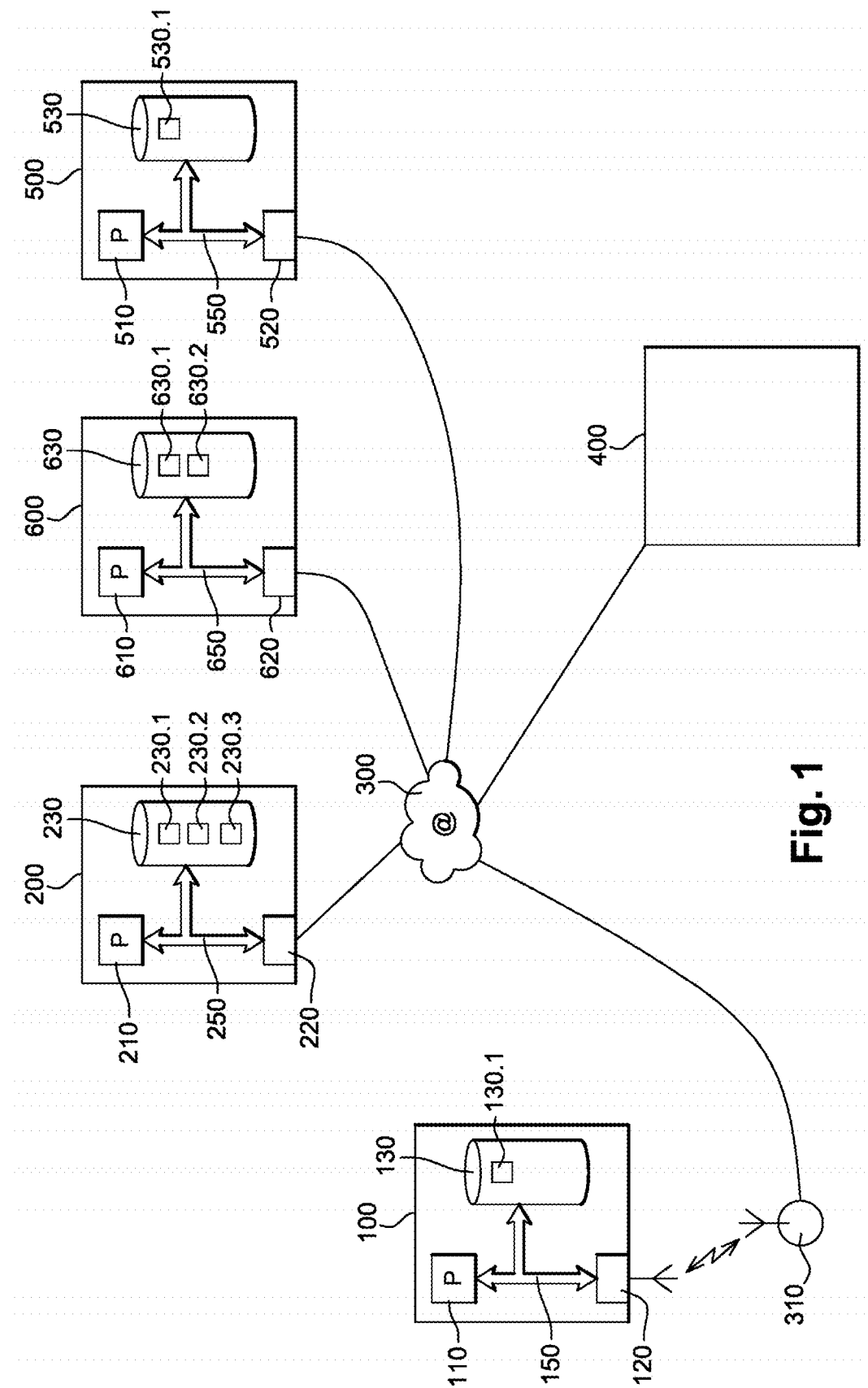
FIG. 1 shows an illustration of an infrastructure enabling the implementation of the securing process according to the invention.

FIG. 1 shows a first intermediate server 200. The first intermediate server 200 is also referred to as a proxy server. In the case of using the SIP session initiation protocol, reference is also made to a SIP proxy.
FIG. 1 shows that the first intermediate server 200 comprises:
A microprocessor 210;
A communication interface 220. Such a communication interface is for example an Ethernet card, an InfiniBand card, a Wi-Fi card, etc. The communication interface 220 enables the intermediate server 200 to communicate with other devices;
Storage means 230. Storage means are for example hard drives, solid-state drives, a disk grid, etc. These means are local or remote.
More generally, for other devices, the storage means can also be produced with flash memory or EPROM-type components.
FIG. 1 shows that the microprocessor of the first intermediate server, the communication interface of the first intermediate server and the storage means of the first intermediate server are interconnected by a bus 250.
FIG. 1 shows that the storage means 230 of the first intermediate server comprise several zones, including at least:
A zone 230.1 for securing a communication. This zone for securing a communication comprises instructions codes which, when they are executed by the first intermediate server, lead to the latter implementing the process according to the invention;
A ticket cache zone 230.2 enabling the first intermediate server to keep tickets for the time required by the processing;
A communication metadata database zone 230.3.
FIG. 1 shows that the first intermediate server 200 is connected to a public network 300, for example the Internet. It is noted that the invention is also effective if the public network is not the Internet but a network compatible with protocols used on the Internet, in particular the protocols named IP and the associated transport protocols.

When an action is attributed to a device, it is actually performed by a microprocessor of the device controlled by instruction codes stored in a memory of the device. If an action is attributed to an application, it is actually performed by a microprocessor of the device in a memory in which the instruction codes corresponding to the application are stored. When a device or an application transmits a message, this message is transmitted via a communication interface of said device or of said application. A message comprises at least a destination address field, a sender address field and a payload. These principles apply whether the device is real or virtual.

FIG. 1 shows a first terminal device 100. The first terminal device comprises:
A microprocessor 110;
A communication interface 120. In the case of a terminal device, the communication interface is for example an interface configured to be able to communicate over a mobile telephony network, in particular in data mode;
Storage means 130.

FIG. 1 shows that the microprocessor of the first terminal device, the communication interface of the first terminal device and the storage means of the first terminal device are interconnected by a bus 150.

FIG. 1 shows that the first terminal device 100 is connected to a base station 310 of a mobile network, not shown. The base station 310 is connected to the public network. The first terminal device is therefore connected to the public network.

FIG. 1 shows that the storage means 130 of the first terminal device comprise several zones, including at least:
A SIP agent zone 130.1 comprising instruction codes to enable the terminal device to carry out communications according to the SIP protocol.

In practice, the first terminal device is a smartphone on which communication software compatible with the SIP protocol has been installed. Such a telephone is also referred to as a SIP telephone or a SIP phone. Such software can also be installed on a tablet or a personal computer. The installation of such software means that the device on which it is installed can be termed a user agent.

FIG. 1 shows a second terminal device 400 which is also a user agent of the same type as the first terminal device. That is to say that the first terminal device and the second terminal device can establish a communication with one another.

FIG. 1 shows a key management server 500. The key management server 500 comprises:
A microprocessor 510;
A communication interface 520 making it possible to connect the key management server to the public network 300. The key management server is therefore able to communicate with the devices connected to the public network 300;
Storage means 530.

FIG. 1 shows that the microprocessor of the key management server, the communication interface of the key management server and the storage means of the key management server are interconnected by a bus 550.

FIG. 1 shows that the storage means 530 of the key management server comprise several zones, including at least:
A zone 530.1 for managing the MIKEY protocol. This zone comprises instruction codes, the execution of which enables the key management server to communicate according to the MIKEY protocol.

FIG. 1 shows a second intermediate server 600. FIG. 1 shows that the second intermediate server comprises:
A microprocessor 610;
A communication interface 620 making it possible to connect the key management server to the public network 300. The key management server is therefore able to communicate with the devices connected to the public network 300;
Storage means 630.

FIG. 1 shows that the microprocessor of the second intermediate server, the communication interface of the second intermediate server and the storage means of the second intermediate server are interconnected by a bus 650.

Figure 2:
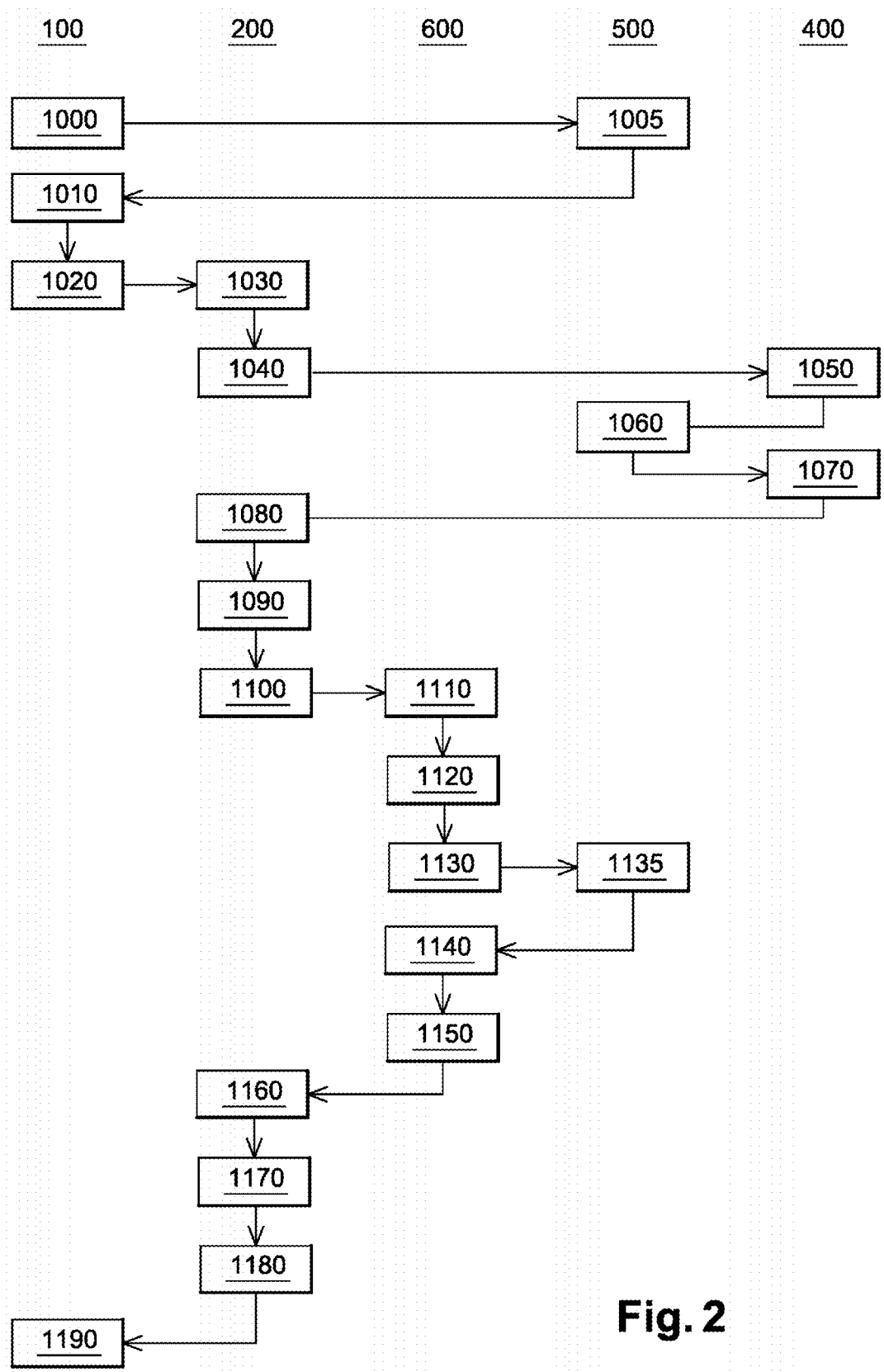
FIG. 2 shows an illustration of steps of the securing process according to the invention.

FIG. 1 shows that the storage means 630 of the second intermediate server comprise several zones, including at least:
A zone 630.1 for managing the MIKEY protocol. This zone comprises instruction codes, the execution of which enables the key management server to communicate according to the MIKEY protocol;
A zone 630.2 for securing a communication. This zone for securing a communication comprises instructions codes which, when they are executed by the second intermediate server, lead to the latter implementing the process according to the invention;

FIG. 2 shows a step 1000 of initialization of a secure communication. Step 1000 of initialization of a communication is implemented by the first terminal device which transmits an initialization request message:
MT:REQUEST_INIT(Idi,Idr,)
bound for the key management server. In this document, the following formula is used for designating a message:
Before the colon: the protocol used for the message
MT: MIKEY protocol
SIP: SIP protocol
MTPROX: specific communication protocol according to the invention;
After the colon: the name of the message;
In brackets: the parameters of the message.

The message for initialization of a secure communication is therefore transmitted according to the MIKEY protocol, and the parameters thereof are a list of identifiers of participants who will be invited to participate in the communication being initialized. The first parameter identifies the first terminal device. In our example, the second parameter Idr identifies the second terminal device.

FIG. 2 shows a step 1010 of receipt, by the first terminal device, of a message of response to the initialization request message:
MT:REQUEST_RESP(k1,k2,TICKET)
This message was produced by the key management server in a step 1005, not described. This message comprises:
A key to encrypt the data transmitted by the first terminal device,
A key to decrypt the data transmitted by the second terminal device,
A TICKET produced for the key management server. TICKET is an established term for the MIKEY protocol; it is essentially an identifier, for the key management server, of the communication being initialized.

From step 1010 of receipt of a message of response to the initialization request message, the first terminal device moves to a step 1020 of production and transmission of a SIP invitation message:
SIP:INVITE(key-mgmt:TICKET)
This message is transmitted bound for the first intermediate server. The aim of this message is to invite the second terminal device; only the elements relevant to the invention are dealt with.

FIG. 2 shows a step 1030 wherein the first intermediate server receives the SIP invitation message. In this step of receipt of a SIP invitation, the first intermediate server detects that there is a parameter with the name "key-mgmt"

and the value of which is a TICKET according to the MIKEY protocol. The first intermediate server then stores this TICKET in a memory to be able to retrieve it subsequently.

The first intermediate server then moves to a step 1040 in which it transmits the SIP invitation message to the second terminal device.

In a step 1050, the second terminal device receives the invitation message transmitted by the first intermediate server. As long as this invitation message comprises a payload containing a TICKET according to MIKEY protocol, the second terminal device establishes a dialog with the key management server. This is a ticket resolution dialog. To establish dialog, the second terminal device transmits a message:

MT:RESOLVE(TICKET,Idr)

where Idr is the identifier of the second terminal device. This is the same identifier as that which was used for the initialization request message.

This ticket resolution dialog is managed, by the key management server, in a ticket resolution step 1060. In the ticket resolution step, the key management server uses the elements of the TICKET to retrieve, inter alia, the keys associated with the communication being initialized.

In a step 1070, the second terminal device receives a message.

MT:RESOLVE_RESP(k1,k2,TICKET_RESPONSE)

which is the result of the ticket resolution transmitted by the key management server. Upon receipt of this message, the second terminal device knows the keys which will be used for the communication being initialized. The second terminal device then produces a SIP invitation acceptance message SIP:OK(key-mgmt=TICKET_RESPONSE)

bound for the first intermediate server.

In a step 1080, the first intermediate server receives the message of acceptance of a SIP invitation. Since this acceptance message comprises a parameter named "key-mgmt" in its payload, then it knows that this message is linked to a communication initialization implementing the MIKEY protocol. If this was not the case, the first intermediate server would have simply transmitted the acceptance message to the first terminal device.

Since the first intermediate server notes that the MIKEY protocol has been used, it then moves to a step 1090 of decoding the TICKET before transmitting the acceptance to the first terminal device. In this step, the first intermediate server produces a decode message:

MTPROX:DECODE(TICKET,TICKET_RESPONSE)

To produce this decode message, the first intermediate server uses the contents of the SIP acceptance message and the contents saved for the receipt of the SIP invitation message. Once this message has been produced, it is transmitted to the second intermediate server. This message is for example a GET or POST http message. The elements TICKET and TICKET_RESPONSE are then parameters of the http request and are optionally encoded in Base64 for their transmission. The protocol named MTPROX in this document is therefore an implementation of the http protocol in the context of communications between the first intermediate server and the second intermediate server.

In a step 1110, the second intermediate server receives a decode message. It then moves to a step 1120 of production of a ticket resolution message MT:RESOLVE(TICKET,2pld)

This resolution message is identical to that produced by the second terminal device except as regards the identifier used. The second intermediate server uses an identifier specific thereto, which enables the key management server recognizing this specific identifier to accept the resolution request. The key management server has therefore been configured beforehand to recognize this specific identifier. This is possible because, although not described, all the communications with the key management server take place after authentication. This specific identifier enables the key management server to consider the second intermediate server to be a guest to the conversation, even though this guest has not been declared by the first terminal device.

Once the resolution message has been produced, the second intermediate server transmits it to the key management server in a step 1130.

This resolution message is processed like a conventional resolution message by the key management server, in a step 1135, not described.

In a step 1140, the second intermediate server receives a resolution response message:

MT:RESOLVE_RESP(k1,k2,TICKET_RESPONSE)

identical to the resolution response message received by the second terminal device. From the perspective of the key management server, the second intermediate server behaves like a terminal device invited to participate in a secure communication. The second intermediate server then moves to a step 1150 of production of a decode response:

MTPROX:DECODE_RESP(k1,k2)

This decode response message is produced from the contents of the resolution response message. This message enables the second intermediate server to transmit to the first intermediate server the session keys used for the communication being initialized.

In a step 1160, the first intermediate server receives the decode response message.

In a step 1170, the first intermediate server processes the contents of the decode response message by updating a communication metadata database.

After the metadata database has been updated, the first intermediate server moves to a step 1180 of transmission of the SIP acceptance message to the first terminal device.

A communication metadata database is a database which enables a telecommunications operator to store legal information associated with establishing communications. For each communication, this information is, for example:
a unique identifier of the communication,
a identifier of the inviter, for example a telephone number, an email address, an IP address, etc.
a identifier of the invitee, for example a telephone number, an email address, an IP address, etc.
a communication start date,
a communication end date.

With the invention, it is possible to add session keys to these elements.

In this case, the session keys can be used in at least two ways:
to carry out live wiretapping of a conversation;
to carry out wiretapping at another point in time of a recorded conversation.

In both cases this is considered to be an interception of a communication, whether in real time or at another point in time.

With the invention, it is therefore possible to use all the key management capacities offered by the MIKEY protocol and to comply with the legal obligations under which telecommunications operators find themselves. This aim is moreover achieved while relying on commercial intermediate servers or SIP proxies. Indeed, there is only very little modification required at the SIP proxy. All the management of the MIKEY protocol is shifted over to the second intermediate server, which affords it a simple communication interface with the first intermediate server.

What is claimed is:

1. A process for end-to-end securing of an interceptible communication between at least a first terminal device and a second terminal device, the process comprising:
 establishing the interceptible communication via a first intermediate server, which communicates using a session initiation protocol making it possible to exchange session keys, each terminal device of said at least the first terminal device and said second terminal device using a session key to encrypt communication data said each terminal device is transmitting,
 distributing the session keys by a key management server which communicates using a key management protocol,
 receiving an invitation message by the first intermediate server, transmitted by the first terminal device, according to the session initiation protocol, the invitation message inviting the second terminal device and comprising a ticket according to the key management protocol,
 receiving, by the first intermediate server, a message of acceptance of the invitation message comprising a result of processing of the ticket by the second terminal device,
 before transmitting the invitation message to the second terminal device, saving, by the first intermediate server, of the ticket received via the invitation message,
 before transmitting the message of acceptance to the first terminal device,
  producing, by the first intermediate server, a ticket decode request message comprising
   the ticket that is saved,
   result of processing of the ticket that is saved,
  transmitting, by the first intermediate server, the ticket decode request message bound for a second intermediate server, such that the second intermediate server receives the ticket decode request message,
 wherein the second intermediate server is between the first intermediate server and the key management server, and
 wherein the key management server comprises a communication interface, such that the communication interface connects the key management server to a public network,
 receiving, by the first intermediate server, a decode response comprising at least the session keys of the interceptible communication being established,
 storing, by the first intermediate server, the session keys by associating the session keys with communication metadata.

2. The process for end-to-end securing of an interceptible communication according to claim 1, wherein the second intermediate server, upon receipt of the ticket decode request message,
 produces a ticket resolution message, according to the key management protocol, comprising
  the ticket that is saved,
  a specific identifier designating the second intermediate server as a particular guest in the interceptible communication being established,
 transmitting the ticket resolution message to the key management server,
 receiving a resolution response,
 producing the decode response based on the resolution response.

3. The process for end-to-end securing of an interceptible communication according to claim 1, wherein the communication metadata are chosen from a set formed of at least:
 a unique identifier of the interceptible communication,
 an identifier of an inviter,
 an identifier of an invitee,
 a communication start date,
 a communication end date.

4. The process for end-to-end securing of an interceptible communication according to claim 1, wherein the interceptible communication between at least the first intermediate server and the second intermediate server are conducted using http protocol.

* * * * *